United States Patent [19]

Sauer

[11] 4,064,671
[45] Dec. 27, 1977

[54] STABILIZER STRUT FOR SUSPENDED CEILING SYSTEM

[75] Inventor: Gale E. Sauer, Williamsville, N.Y.

[73] Assignee: Roblin Industries, Inc., Buffalo, N.Y.

[21] Appl. No.: 694,207

[22] Filed: June 9, 1976

[51] Int. Cl.² .................................................. E04B 5/52
[52] U.S. Cl. ........................................ 52/696; 52/488;
        52/669; 403/247; 403/253; 403/353; 403/363
[58] Field of Search ................. 52/696, 667, 666, 484,
            52/488, 669; 403/233, 247, 253, 347, 353

[56] References Cited

U.S. PATENT DOCUMENTS

| 839,723   | 12/1906 | Bury .............................. 52/720 X |
| 3,032,833 | 5/1962  | Stanley ............................. 52/484 |
| 3,092,221 | 6/1963  | Parsons et al. ................. 52/720 X |
| 3,503,641 | 3/1970  | Fraser ............................ 52/667 X |
| 3,640,042 | 2/1972  | Kidney .......................... 52/488 X |
| 3,755,988 | 9/1973  | van der Shuys .................. 52/664 |

FOREIGN PATENT DOCUMENTS

| 232,799   | 2/1961  | Australia ........................... 52/484 |
| 6,404,889 | 11/1965 | Netherlands ...................... 52/664 |
| 1,343,435 | 1/1974  | United Kingdom ............... 52/696 |
| 1,431,312 | 4/1976  | United Kingdom ............... 52/667 |

Primary Examiner—Alfred C. Perham

[57] ABSTRACT

A stabilizer strut extending transversely between grid members in a supporting grid system and the like. The strut includes a pair of leg portions disposed at right angles to one another with each end of the strut including a pair of aligned slot portions for engagement with an underlying grid member. Each grid member includes an upstanding web means surmounted by a bead means wherein the latter receives the pair of aligned slot portions which are open at the non-adjacent, lateral edges of the strut leg portions. One slot on each end of the strut corresponding to one another include a locking projection extending inwardly from the side of the slot at a point adjacent to the open end thereof at the lateral edge of the strut. The locking projection is adapted to extend beneath the bead means of a grid member to restrain the strut against vertical uplift while the other slot at each end of the strut is of a width adapted to be received over the bead means so as to be in sufficient lateral engagement therewith to provide stabilized lateral support between the grid members.

14 Claims, 7 Drawing Figures

STABILIZER STRUT FOR SUSPENDED CEILING SYSTEM

THE BACKGROUND OF THE INVENTION

This invention relates generally to supporting grid systems and the like for suspended ceilings and, more particularly, to a stabilizer strut extending between adjacent grid members for laterally locating one with respect to the other so as to ensure the maintenance of appropriate relative spacing of the grid members and correspondingly the ultimate support of a suspended ceiling.

The present invention is particularly adapted for use in ceiling tile supporting grid systems of the type comprising a plurality of parallel, spaced main grid members wherein each grid member includes an upstanding web means surmounted by a bead means extending longitudinally along the upper longitudinal edge thereof and flange means extending laterally outwardly of the plane of said web means for supporting the edge portions of ceiling tiles. Such grid members generally are suspended from a conventional ceiling or an overhead support structure.

The prior art has utilized stabilizer struts to extend between adjacent grid members for connection therewith. The strut functions to fix the lateral spacing between the grid members in a positive manner. The function served is important due to the fact that ceiling tiles usually are supported on the laterally extending flanges of the grid members refereed to hereinabove. In view of the fact that such flanges extend outwardly from the web of the grid member a relatively short distance as compared to the spacing between adjacent grid members, it is important that the grid members do not experience relative movement in a lateral sense between one another so that the ceiling tiles maintain overlying, supported engagement with the grid member flanges.

One of the problems encountered in supporting grid systems, in addition to the basic need for stabilizer struts, is to provide a stabilizer strut which may be installed quickly and easily, without time consuming assembly procedures. Furthermore, it is important to provide a stabilizer strut which when so assembled is not subject to becoming easily displaced or disassembled so as to impair the integrity of the supported ceiling tiles.

SUMMARY OF THE INVENTION

Accordingly, an object of the present invention is to provide a new and improved stabilizer strut for a supporting grid system which may be quickly and easily assembled.

Another object of the present invention is to provide an improved stabilizer strut which upon assembly in a grid system is firmly locked in place with respect thereto.

A further object of the present invention is to provide the aforesaid stabilizer strut possessing the requisite stability and strength for maintaining adjacent grid members in a fixed position with respect to one another without the use of any additional components.

In one aspect thereof, the stabilizer strut of this invention is characterized by a longitudinally extending body having a pair of angularly related leg portions for locking engagement at each of its ends with a grid member. Each of the ends of the strut includes a pair of axially aligned slots extending inwardly from the non-adjacent, lateral edges of the leg portions wherein one corresponding slot on each end includes a locking projection or tab adapted to extend beneath the bead means of a grid member to restrain the strut against vertical uplift when the slotted portions have been appropriately mounted over the bead means. The other slot on each end of the strut, not including a locking projection, is of a width so as to be in sufficient lateral engagement with the bead of the grid member to provide stabilized lateral support between the grid members and to maintain the locking projection or tab in place beneath the grid bead.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF A PREFERRED EMBODIMENT

Figure 1:
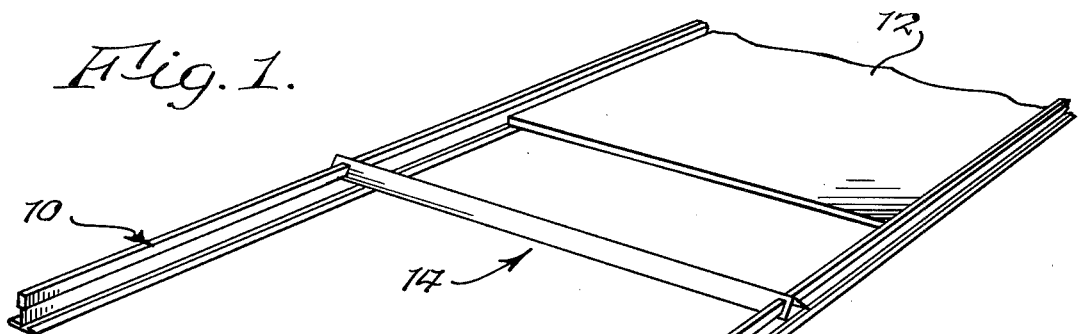
FIG. 1 is an isolated, perspective view of a pair of spaced, substantially parallel grid members supporting a ceiling tile along their adjacent flanged portions with a stabilizer strut comprising the present invention being shown in assembled position extending transversely between the grid members.
Figure 2:
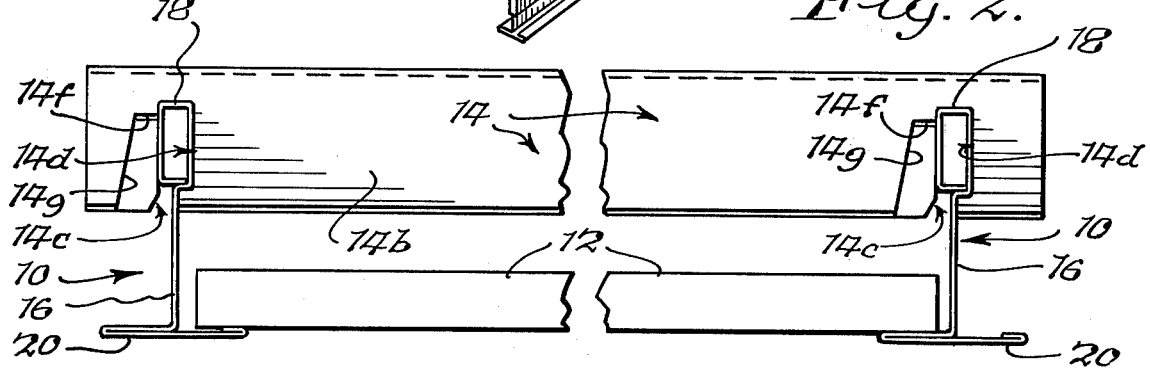
FIG. 2 is a transverse, elevational view of the grid member-stabilizer strut assembly as shown in FIG. 1.

Referring now in detail to the illustrative embodiment depicted in the accompanying drawings, there is shown in FIG. 1 a portion of a suspended ceiling system including spaced, parallel grid members 10 supporting an intermediately disposed ceiling tile 12. A stabilizer strut 14, comprising the present invention, extends transversely between the grid members 10 to maintain the latter in a fixed, spaced disposition with respect to one another. As illustrated in FIG. 2, each of the grid members 10 includes an upstanding web means 16 surmounted by a bead means 18 extending longitudinally along the upper longitudinal edge of web means 16. In addition, each grid member includes a flanged supporting surface 20 which extends laterally outwardly with respect to the plane of web 16. As is clearly evident from FIG. 2, the flange means 20 functions to support the ceiling tile 12 along the edge portions thereof. As is to be further understood from a consideration of FIG. 2, the spacing between grid members 10 is substantially greater than the amount of lateral engagement provided between the ceiling tiles and flange means 20 so that it is most important that the grid members 10 do not experience relative lateral movement with respect to one another whereby the ceiling tile 12 could move out of supported engagement with the flanges 20. In view of the fact that a good number of suspended grid systems are hung from overhead structural frames by means of hanging wires, for example, it would be quite possible for the grid members to sway laterally with respect to one another absent the provision of a stabilizer strut as shown in FIG. 1.

As viewed in FIGS. 5 and 6, the strut of the present invention includes an elongated body having a pair of right angularly related leg portions 14a and 14b, although as will appear hereinbelow, the strut forming the present invention would be operable if the leg portions 14a and 14b were not at a right angle with respect to one another. It is to be further appreciated that only each end of the strut need have a pair of angularly related leg portions with slots, to be described hereinbelow, for engagement with grid members. The mid-portion of the strut could be essentially of any cross sectional configuration, serving only to rigidly connect the ends of the strut together.

Figure 3:
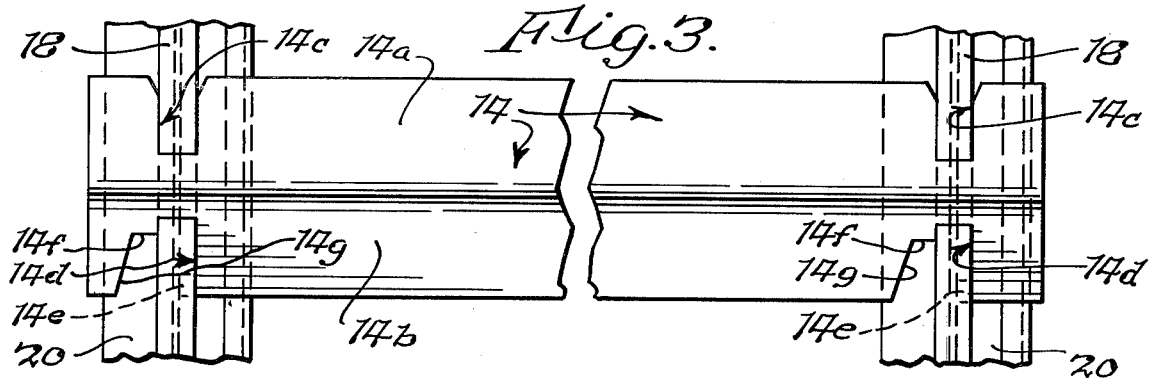
FIG. 3 is a top plan view in fragmentary form of the stabilizer strut as shown in FIG. 2.

As best seen in FIG. 3, each end of the strut includes a pair of slot portions 14c and 14d which are axially aligned with respect to one another and as shown are disposed in a perpendicular orientation with respect to the longitudinal axis of the strut body. As will be described in detail with respect to the illustrations in FIGS. 4 through 6, slot 14d includes a locking projection 14e which is adapted to extend beneath the undersurface of bead 18 which extends laterally outwardly from the plane of web 16. As is further apparent from FIG. 3, each pair of aligned slots extend inwardly from the non-adjacent lateral edges of the respective leg portions whereby the slot 14d may be received over bead 18 with the locking projection 14e being situated immediately below the bead and with slot 14c also being received over the grid bead. Assembly of the strut in this manner prevents the same from being haphazardly dislodged from engagement with a grid member.

Figure 4:
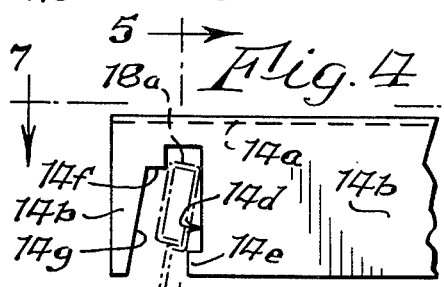
FIG. 4 is an isolated fragmentary view of an end portion of a stabilizer strut illustrating the orientation of a grid member prior to final assembly with the strut.

Turning now to a consideration of the assembly steps for properly engaging the strut between a pair of grid members, it is to be noted that slot 14d further includes a shouldered portion 14f on the side of the slot opposite from the locking projection 14e. As shown in FIGS. 4 and 5 taken together, the strut 14 is assembled by initially placing it in a transverse orientation with respect to a pair of grid members with the leg portion 14b being rotated into a vertical planar orientation. With the opening of each slot 14d directly over each grid bead 18, the strut is lowered so that the upper lateral edge 18a of the bead engages the side 14g of the slot. Side 14g is opposite to the side including locking projection 14e and slopes toward that side of the slot associated with the locking projection to intersect with shouldered portion 14f. In so engaging the strut over the grid bead, the latter tends to tilt as shown in FIG. 4 whereby the top of the bead may be slid into that portion of the slot extending between the shouldered portion 14f and the slot 14c aligned therewith. In so engaging the top of bead 18 within the innermost end of slot 14d, the underside of the bead becomes disposed above the locking projection or tab 14e in a spaced manner as indicated in FIG. 5.

Figure 5:
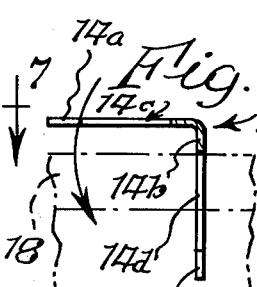
FIG. 5 is a transverse view of the strut partly in section as taken about on line 5—5 of FIG. 4.
Figure 6:
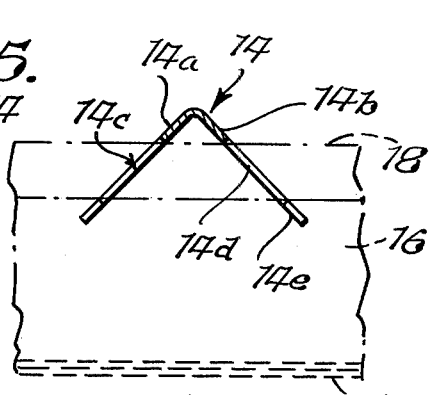
FIG. 6 is a view similar to FIG. 5 showing the strut in a final, assembled position with respect to a grid member.

Subsequent to these assembly steps just described, the entire strut body is rotated in a counter clockwise direction as viewed in FIG. 5 to assume the position shown in FIG. 6 with slot 14c fully being received over the bead 18 and the locking projection 14e rotating upwardly to engage the undersurface of the bead.

Figure 7:
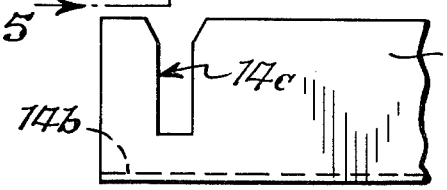
FIG. 7 is an isolated, fragmentary view of an end portion of the stabilizer strut as taken about on line 7—7 of FIG. 4.

As is evident from the profile of slot 14c as seen in FIG. 7, the beveled opening therein facilitates ready engagement of slot 14c over the bead while the remaining portion of 14c is of a width so as to be in sufficient lateral engagement with the bead to provide stabilized lateral support between the grid members and to maintain the locking projection 14e in proper position beneath the bead.

As will be apparent to one familiar with this art, when the slot 14c is engaged over the bead, the locking projection 14e cannot be dislodged from beneath the bead so that the strut cannot be vertically lifted from the grid member unless the assembly steps described hereinabove are performed in a reverse manner. Therefore, after assembling the strut on the grid members, the force of gravity will maintain the same in a firmly locked position thereon.

From the foregoing, it is apparent that the objects of the present invention have been fully accomplished. As a result of this invention, an improved stabilizer strut is provided for maintaining the installed integrity of a suspended ceiling structure by maintaining a fixed lateral relationship between adjacent grid members. The stabilizer strut forming the present invention can be installed quickly and easily without the necessity for separate fastening components to maintain the strut in position while at the same time being locked, in a vertical sense, onto the grid members.

Having thus described and illustrated a preferred embodiment of my invention, it will be understood that such description and illustration is by way of example only and that such modifications and changes as may suggest themselves to those skilled in the art are intended to fall within the scope of the present invention as limited only by the appended claims.

I claim:

1. In combination with a pair of spaced grid members disposed in a substantially parallel manner with respect to one another, a stabilizer strut for lateral connection between said grid members which form a supporting grid system and the like wherein each grid member includes an upstanding web means surmounted by a bead means extending longitudinally along the upper longitudinal edge of said web means and laterally outwardly of at least one side of said web means, said stabilizer strut comprising:

an elongated body extending between a pair of grid members, said body having a pair of angularly related leg portions at each of its ends in locking engagement with a grid member, each of said pair of leg portions including a pair of aligned slot portions extending inwardly from the non-adjacent, lateral edges of said leg portions wherein only one of said aligned slot portions on each end of said body which correspond to one another includes a locking projection extending beneath said bead means to restrain said strut against vertical uplift with respect to said grid members and the other of said aligned slot portions is of a width so as to be received over said bead means in sufficient lateral engagement therewith to provide stabilized lateral support between a pair of grid members and to maintain said locking projection in place beneath said bead means.

2. The combination as set forth in claim 1 wherein each said pair of aligned slot portions of said strut are substantially perpendicular to the longitudinal axis thereof whereby said strut is assembled in a substantially perpendicular manner to each of said grid members.

3. The combination as set forth in claim 1 wherein said locking projection comprises a tab portion extending into said slot to extend beneath said bead means.

4. In combination in a supporting grid system and the like wherein a grid member includes an upstanding web means surmounted by a bead means extending longitudinally along the upper longitudinal edge of said web means and laterally outwardly of at least one side of said web means, a stabilizer strut for lateral connection between grid members, said stabilizer strut comprising;

an elongated body adapted to extend between a pair of grid members, said body having a pair of angularly related leg portions at each of its ends adapted for locking engagement with a grid member, each of said pair of leg portions including a pair of aligned slot portions extending inwardly from the non-adjacent, lateral edges of said leg portions wherein one of said aligned slot portions includes a locking projection adapted to extend beneath said bead means to restrain said strut against vertical uplift with respect to said grid members and the other of said aligned slot portions is of a width adapted to be received over said bead means so as to be in sufficient lateral engagement with said bead means to provide stabilized lateral support between a pair of grid members and to maintain said locking projection in place beneath said bead means, and a pair of spaced grid members disposed in a substantially parallel manner with respect to one another wherein each said pair of aligned slot portions of said strut are substantially perpendicular to the longitudinal axis thereof whereby said strut is assembled in a substantially perpendicular manner to each of said grid members.

5. A stabilizer strut as set forth in claim 4 wherein the side of said slot opposite said locking projection includes a shouldered portion so that upon reception of said slot over said bead means said shouldered portion abuts said bead means to align said locking projection with the underside of said bead means.

6. A stabilizer strut as set forth in claim 5 wherein the end portion of said slot extending between said shouldered portion associated therewith and the other said slot is of a width adapted to be received over said bead means so as to be in sufficient lateral engagement with said bead means to provide stabilized lateral support between a pair of grid members and to maintain said locking projection in place beneath said bead means.

7. A stabilizer strut as set forth in claim 6 wherein said locking projection is located adjacent to said non-adjacent, lateral edge of said leg portion associated therewith.

8. A stabilizer strut as set forth in claim 6 wherein the side of said slot opposite said locking projection is sloped toward the side of said slot associated with said locking projection along the length thereof extending to said shouldered portion.

9. A stabilizer strut as set forth in claim 4 wherein said locking projection comprises a tab portion extending into said slot so as to be adapted to extend beneath said bead means.

10. A stabilizer strut as set forth in claim 9 wherein the side of said slot opposite said locking projection includes a shouldered portion so that upon reception of said slot over said bead means said shouldered portion abuts said bead means to align said locking projection with the underside of said bead means.

11. A stabilizer strut as set forth in claim 10 wherein the end portion of said slot extending between said shouldered portion associated therewith and the other said slot is of a width adapted to be received over said bead means so as to be in sufficient lateral engagement with said bead means to provide a stabilized lateral support between a pair of grid members and to maintain said locking projection in place beneath said bead means.

12. A stabilizer strut as set forth in claim 11 wherein the side of said slot opposite said locking projection is sloped toward the side of said slot associated with said locking projection along the length thereof extending to said shouldered portion.

13. A stabilizer strut as set forth in claim 11 wherein said slots including said locking projections are disposed on the same said leg portion.

14. A stabilizer strut as set forth in claim 9 wherein said locking projection is located adjacent to said non-adjacent, lateral edge of said leg portion associated therewith.

* * * * *